Sept. 13, 1966  D. N. WAGNON  3,271,881
TEACHING AID
Filed March 4, 1964  2 Sheets-Sheet 1
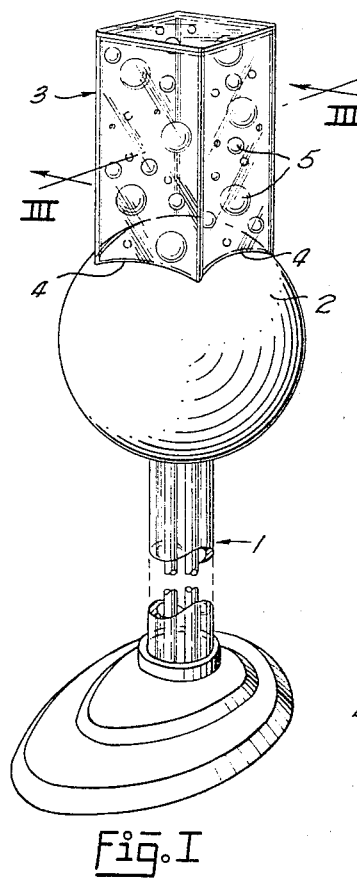
Fig. I
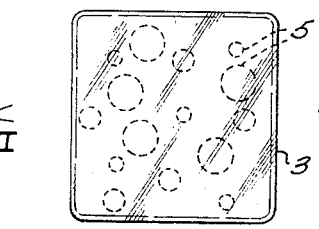
Fig. II
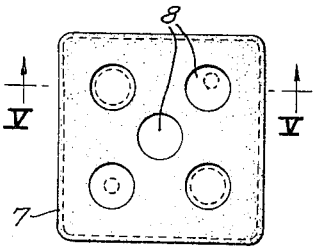
Fig. IV
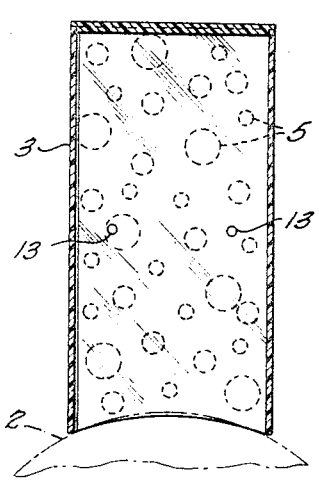
Fig. III
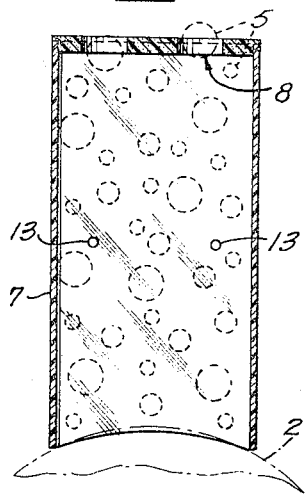
Fig. V
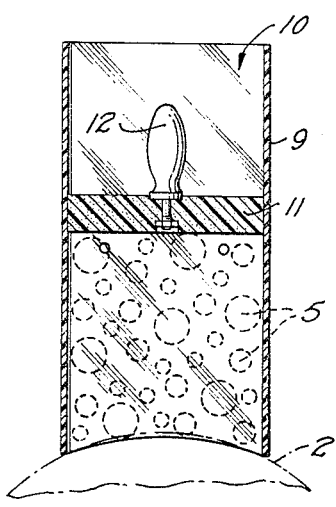
Fig. VIII
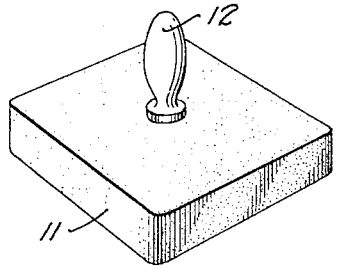
Fig. VII
Fig. VI
INVENTOR
David N. Wagnon
BY Howard E. Moore
ATTORNEY

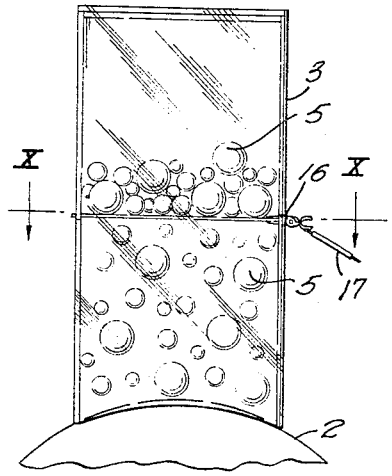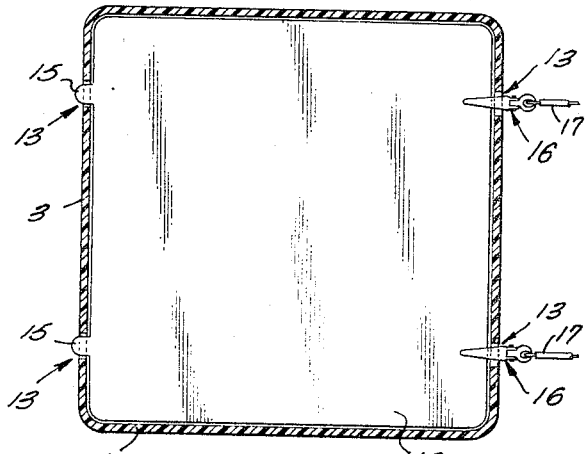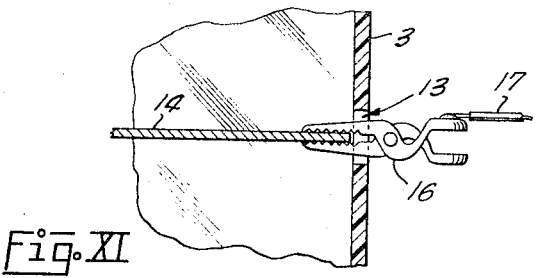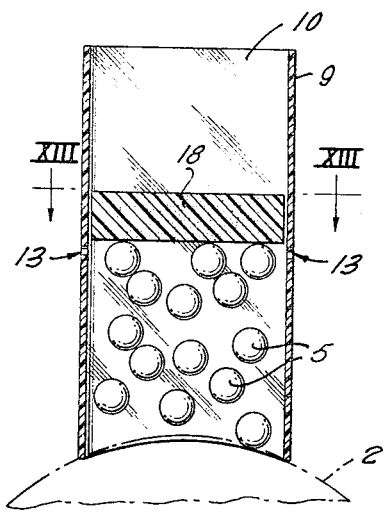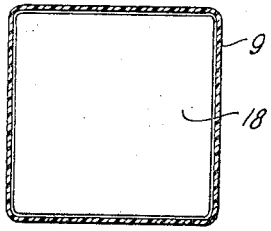

_United States Patent Office_ 3,271,881
Patented Sept. 13, 1966

3,271,881
TEACHING AID
David N. Wagnon, 4005 Modlin St., Mesquite, Tex.
Filed Mar. 4, 1964, Ser. No. 349,433
11 Claims. (Cl. 35—19)

This invention is concerned with a teaching aid, and is particularly concerned with a teaching aid for demonstration of random molecular motion, and variations thereof for demonstrating evaporation, physical phases (gas, liquid and solid), demonstration of thermal conduction or insulation, kinetic leveling effect, Brownian motion, and conservation of momentum.

In teaching physics, it is desirable to demonstrate to the student by visual means, molecular structure and movement, and the phenomena resultant from the random movement of atoms or molecules in physical substances.

The present invention is intended to provide a relatively simple, inexpensive device to be used in conjunction with a Van de Graaff static electricity generator, commonly found in school laboratories, to visually illustrate random molecular motion and the various phenomena thereof, such as evaporation, compression, physical phases such as gas, liquid and solid, thermal conduction, insulation, kinetic leveling effect, Brownian motion, and conservation of momentum.

Other and further objects of the invention will become apparent upon referring to the detailed description hereinafter following and to the drawings attached hereto.

Suitable embodiments of the invention are shown in the drawings, wherein:

FIGURE I is a side perspective view of a conventional Van de Graaff static electricity generator, with the transparent box, housing or cylinder positioned thereon with the graphite coated balls, representing atoms or molecules contained therein.

FIGURE II is a top plan view of the box or housing;

FIGURE III is a cross-sectional, elevational view of the box or housing taken on the line III—III of FIGURE I;

FIGURE IV is a top plan view of a modified form of box or housing, having holes in the upper end thereof through which simulated molecules may pass to illustrate evaporation;

FIGURE V is a cross-sectional, elevational view taken along the line V—V of FIGURE IV;

FIGURE VI is an enlarged partially sectionalized, elevational view of one of the graphite coated balls which is representative of a molecule;

FIGURE VII is a top perspective view of a plunger to be employed with a modified form of housing to illustrate the physical phases, such as gas, liquid, and solid;

FIGURE VIII is a cross-sectional, elevational view of modified form of housing, with snugly fitting plunger therein which may be employed to illustrate physical phases;

FIGURE IX is a side elevational view of a modified form of molecular motion demonstration device wherein a plate of conductive material is placed transversely thereof which is attached to an external conductor to illustrate thermal conduction or insulation;

FIGURE X is a transverse sectional view taken along the line X—X of FIGURE IX;

FIGURE XI is an enlarged fragmentary elevational view showing a clamp extending through a hole in the wall of the housing with a ground wire attached thereto, said clamp being attached to the conductor plate employed with the modified form of FIGURES IX and X;

FIGURE XII is a cross-sectional, elevational view of another modified form of molecular motion demonstration device wherein is employed a floating piston placed over the graphite coated balls, representing molecules to demonstrate kinetic leveling effect; and FIGURE XIII is a transverse sectional view taken along the line XIII—XIII of FIGURE XII.

Numeral references are employed to indicate the various parts shown in the drawings, and like numerals indicate like parts throughout the various figures of the drawings.

The numeral 1 generally indicates a conventional Van de Graaff static electricity generator, having a static electricity collecting sphere 2 on the upper end thereof.

A housing 3 which may be in any suitable shape, such as square (as shown) or cylindrical, is made of transparent material, such as plastic, and has a closed upper end and an open lower end which, as shown, may have curved edges 4 to conform to the surface of the sphere 2.

A plurality of spheres or balls 5, which are of varying size, may be made of suitable material, preferably foam plastic, to impart lightness thereto, are disposed in the housing 3. The spheres 5, an enlargement of one of which is shown in FIGURE VI, are preferably coated with graphite or other conductive material, indicated at 6. The spheres 5 are representative of random molecules. When the Van de Graaff static electricity generator is energized, and static electricity is formed on the surface thereof, such static electricity would have a tendency to discharge to the conducting coating 6 on the spheres 5 and will repel same, causing the spheres to move rapidly upwardly in the housing 3. The spheres 5 closest to the Van de Graaff generator sphere 2 are thus repelled and move upwardly and then fall back. Thus there is a continuous turbulence created by the random upwardly and downward movement and collisions of the molecule representative spheres 5, which can be demonstrated visually to the student, to give him a very graphic demonstration of random molecular motion.

A modified form is shown in FIGURE IV wherein a modified transparent housing 7 is shown, having holes 8 in the upper end thereof. As the spheres 5 are agitated and move upwardly and downwardly in the housing 7, occasionally one of the spheres will register with one of the holes 8, and the sphere will be expelled from the housing. This illustrates the phenomenon of evaporation wherein molecules are impelled at such a rate that they leave the surface of the material in which they are carried.

Still another modified form is shown in FIGURES VII and VIII, wherein a housing 9 is provided, which is open at the upper and lower ends thereof and is disposed on the Van de Graaff generator sphere 2. The upper end of the housing 9 is open and has slidably disposed therein a relatively tightly fitting plunger 11, which is preferably made of lightweight material such as foam plastic. The plunger 11 has a handle thereon for convenience in handling. The plunger 11 is disposed above the spheres 5, which are representative of molecules.

The variation of the depth of the plunger 11 in the housing 9 will vary the random movement and extent of movement of the spheres 5, which may be employed to illustrate physical phases such as gas, liquid or solid. For instance, when the plunger 11 is disposed in the upper end of the housing 9, the spheres 5 have relatively free movement and move up and down in the housing in random motion, as they are repelled by the static charge on the sphere 2 of the Van de Graaff generator. Upon pushing the plunger 11 downwardly in the housing 9, the movement of the spheres 5 is restricted, thereby reducing the random movement of the molecules, represented by spheres 5, in the housing. This position may be used to illustrate the liquid phase. Upon pushing the plunger 5 further downwardly in the housing 9, a point may be eventually reached where the molecules 5 have very little or no movement, thus illustrating the solid phase.

The housings 3 and 9 include oppositely disposed pairs of holes 13 in opposite walls thereof. A shelf 14, made of electrical conducting material, has tabs 15 on one edge thereof arranged to be passed through a pair of the passages 13, to support the shelf 14 at one edge.

Metal electrically conducting spring clamps 16 may be passed through the pair of passages 13 in the opposite wall of the housing 9 and engaged with the edge of the shelf 14. Conductor wires 17 are attached to the clamps 16, and are grounded at their other ends.

Molecule representing spheres 5 are placed in the housing 3 above and below the shelf 14.

The shelf 14 intercepts and grounds the electrical discharge from the sphere 2 of the Van de Graaff generator through the clamps 16 and ground wire 17. Thus the spheres 5 below the shelf 14 are caused to move in random motion by being repelled by the static electricity charge on the sphere 2, but the spheres 5 above the shelf 14 remain stationary, because the electric charge is carried off by the shelf 14 and grounded. This illustrates the principle of insulation.

On the other hand if the ground wires 17 are not grounded, the electric charge will pass through the shelf 14 and act against the spheres 5 thereabove and cause random movement thereof. This would illustrate the principle of thermal conduction.

As shown in FIGURES XII and XIII, a floating piston 18 may be loosely disposed in the housing 9. The piston 18 is preferably made of very light material, such as foam plastic, and would rest upon the graphite coated spheres 5 when no electrical charge is imparted thereto from the Van de Graaff generator. However, when the Van de Graaff generator is energized, the static electricity formed on the sphere 2 thereof, would impart a charge to the balls 5 and cause upward random movement thereof, thereby lifting the piston 18 in the housing 9, until it reaches a point therein so that the weight thereof would counteract the upward force exerted by the agitated balls 5. This experiment would demonstrate kinetic leveling effect.

Brownian motion may be demonstrated by placing a large uncoated plastic foam sphere in with many smaller coated ones. The random movement of the large sphere being pushed by collisions with the small coated spheres will represent the Brownian motion of particles, normally under a microscope, caused by collisions of molecules in kinetic motion.

Conservation of momentum may be demonstrated by attaching the spheres 5 in pairs, or other multiple numbers, to observe the decrease in speed with the increase in mass.

The foregoing are representative of the types of experiments which may be performed with my unique device, it being understood that other similar experiments could be performed therewith.

Thus it will be seen that I have provided a simple, relatively inexpensive device for visually demonstrating the phenomena of molecular structure and motion, and the resultant effects thereof.

It will be understood that other and further embodiments of my invention may be made without departing from the spirit and scope of the appended claims.

Having described my invention, I claim:

1. In combination with a static electricity generator having a sphere thereon, a housing made of transparent material positioned on the upper surface of the sphere and having an open lower end, with edges conforming to the surface of the sphere; a plurality of free members in the housing having surfaces thereon of conducting material.

2. The combination called for in claim 1 wherein the upper end of the housing is closed.

3. The combination called for in claim 1 wherein the upper end of the housing is open.

4. The combination called for in claim 1 wherein the upper end of the housing is closed and the upper end thereof has at least one hole therein through which the free members may pass.

5. The combination called for in claim 1 with the addition of a plunger slidably positioned in the housing above the free members.

6. The combination called for in claim 1 wherein the housing has oppositely disposed pairs of holes in the walls thereof; with the addition of a shelf made of conducting material having tabs on one edge thereof positioned in one pair of the holes; and clamps made of conductive material extending through the other pair of holes engaging the other edge of the shelf.

7. The combination called for in claim 6 with the addition of ground wires attached to the clamps; with the free members disposed above and below the shelf (or partition).

8. The combination called for in claim 1 with the addition of a piston loosely disposed in the housing above the free members.

9. The combination called for in claim 1 wherein the free members are made of foam plastic and are coated with graphite.

10. The combination called for in claim 5 wherein the plunger is made of foam plastic.

11. The combination called for in claim 8 wherein the piston is made of foam plastic.

References Cited by the Examiner

W. M. Welch Scientific Company catalogue for 1954, "Scientific Apparatus and Supplies," Q–185–W43–1954.

EUGENE R. CAPOZIO, *Primary Examiner.*